United States Patent [19]
Morland et al.

[11] Patent Number: 4,944,899
[45] Date of Patent: Jul. 31, 1990

[54] PROCESS AND APPARATUS FOR CASTING LENSES

[75] Inventors: Albert H. Morland, Lower Swanwick; Timothy J. Warren, Bursledon, both of England

[73] Assignee: CooperVision, Inc., Palo Alto, Calif.

[21] Appl. No.: 119,269

[22] Filed: Nov. 9, 1987

Related U.S. Application Data

[63] Continuation of Ser. No. 840,781, Mar. 18, 1986, abandoned.

[30] Foreign Application Priority Data

Mar. 19, 1985 [GB] United Kingdom ............... 8507007

[51] Int. Cl.$^5$ .............................................. B29D 11/00
[52] U.S. Cl. ...................................... 264/1.4; 264/2.2; 264/2.5; 264/40.2; 425/135; 425/150; 425/174.4; 425/808
[58] Field of Search ............. 264/1.1, 1.4, 2.2, 40.2, 264/40.5, 2.5; 425/808, 171, 174.4, 135, 150

[56] References Cited

U.S. PATENT DOCUMENTS

| | | | |
|---|---|---|---|
| 2,332,674 | 10/1943 | Smith | 264/40.2 |
| 3,005,234 | 10/1961 | Oriani et al. | 425/808 |
| 3,423,488 | 1/1969 | Bowser | 264/2.2 |
| 3,894,710 | 7/1975 | Sarofeen | 249/117 |
| 4,113,224 | 9/1978 | Clark et al. | 264/2.2 |
| 4,402,659 | 9/1983 | Greenbaum | 264/2.2 |
| 4,440,699 | 4/1984 | Smid et al. | 264/1.4 |
| 4,469,646 | 9/1984 | Rawlings | 264/2.2 |
| 4,540,532 | 9/1985 | Petcen et al. | 264/1.1 |
| 4,565,348 | 1/1986 | Larsen | 425/808 |
| 4,623,496 | 11/1986 | Verhoeven et al. | 425/808 |

FOREIGN PATENT DOCUMENTS 2040213 8/1980 United Kingdom ............... 264/1.1

Primary Examiner—James Lowe
Attorney, Agent, or Firm—Vorys, Sater, Seymour & Pease

[57] ABSTRACT

A process for casting lenses using male and female mold halves, which includes placing a polymerizable liquid into the female mold, introducing the male mold down into the female mold until the male mold touches the surface of the liquid and then allowing the male mold to fall into the female mold. Also, an apparatus suitable for carrying out the casting process is provided which includes a horizontal support for the female mold, a holder for releasably holding the male mold, a mechanism for moving the holder down towards and into the female mold and a mechanism for detecting contact between the male mold and the surface of the liquid and causing the holder to then release the male mold. The molds are maintained under a predetermined closing pressure during curing by spot welding their flanges together while under that pressure.

11 Claims, 3 Drawing Sheets

PROCESS AND APPARATUS FOR CASTING LENSES

This is a continuation of Ser. No. 840,781, filed Mar. 18, 1986, now abandoned.

FIELD OF THE INVENTION

This invention relates to the manufacture of lenses, especially contact lenses, by a casting procedure.

DESCRIPTION OF RELATED ART

Although casting potentially provides one of the cheapest methods of manufacture of contact lenses, its adoption by manufacturers has been restricted because of difficulties in producing lenses of consistent quality. Typical problems are development of bubbles or voids in the cured polymer of the lenses or surface or edge distortions, all of which lead to rejection of a high proportion of the molded lenses at the inspection stage.

T. H. Shepherd in U.K. patent No. 1,575,694 (corresponding to U.S. Pat. No. 4,121,896) proposed the use of polypropylene molds in which the edge of the cast lens is defined by an integral, flexible rim, usually on the male mold half.

According to the process described by Shepherd, lenses are cast by filling suitable polymerizable liquid composition into the female mold half and pressing the male mold half into the female mold cavity until excess polymerizable liquid is displaced. The filled mold is maintained at a controlled temperature until the composition has polymerized to a clear solid. During polymerization, a monomer mixture will undergo shrinkage, which depends on the nature of the monomer mixture but has been estimated to lie normally between 10 and 20 volume %. Cast lenses are frequently observed to contain bubbles or voids and Shepherd attributed these to the failure to allow for the shrinkage arising on polymerization. His flexible rim was therefore intended to deflect inwardly during polymerization and in this way to compensate for the volume shrinkage. However, formation of bubbles and voids has not been eliminated in the process described in the Shepherd patent, particularly in the case of lenses cast from hydroxyethyl methacrylate (HEMA).

Rawlings in U.S. Pat. No. 4,469,646 attributes the formation of bubbles and voids in the operation of the Shepherd process to the manner in which the two mold halves are brought together. While it is certainly important to control the manner in which the mold is closed, the Rawlings procedure will not ensure that bubbles and voids are prevented and that cast lenses of consistently good quality are produced.

Nevertheless, the manner in which the mold is filled and closed is of some importance. We have found that if the mold halves are brought together too quickly, bubbles are invariably produced, while closure at too slow a speed can cause formation of voids. In addition, we have determined that the mold halves should come together properly aligned to the center-line of the molds.

BRIEF SUMMARY OF THE INVENTION

According to one aspect of the present invention there is provided a process for casting lenses using male and female mold halves formed from a plastic material in which a polymerizable liquid composition is placed in the female mold half, said process comprises inserting the male mold into the female mold until the male mold touches the surface of the liquid composition, allowing the male mold half to fall under its own weight into the female mold half and then pressing the mold halves together and maintaining the resultant closing pressure until the composition has polymerized.

The invention also includes a substantially horizontal support for the female mold, a holder for releasably holding the male mold, means for moving the holder towards and into the female mold along a substantially vertical path passing through the axes of the mold and means for detecting contact between the male mold and the surface of the liquid composition and causing said holder to release the male mold.

In the mold closing procedure of the present invention, the male mold continually moves towards the female mold from the moment closure is initiated. This is in contrast to the procedure described by Rawlings in which the mold closure is arrested and preferably reversed when the male mold contacts the surface of the liquid monomer. The speed of approach prior to contacting the liquid monomer surface is immaterial. On the instant of contact with the liquid surface, the male mold is released and falls into the female mold. On being wetted with the monomer, surface tension assists the drawing together of the two molds which align themselves correctly during this stage.

Contact between the male mold and the liquid can be sensed, e.g. by directing an infra-red beam along the axes of the molds, and the male mold released at this instant.

In order to produce lenses of consistent quality, it has been found that it is also important to maintain a predetermined pressure on the molds during the entire period from closing the mold until polymerization of the monomer composition is complete. In the past this has involved careful control of the lens closing and polymerization steps by maintaining the filled molds in a special jig which is loaded with a predetermined weight. This has been an expensive and laborious procedure.

According to another aspect of the present invention there is provided a process for casting lenses in which a polymerizable liquid monomer composition is filled into a mold comprising male and female mold halves and held in the mold until the monomer composition has polymerized to a solid condition, wherein after introduction of the liquid monomer composition the mold is closed under a predetermined load and the mold halves bonded together (preferably by welding) while under said load. This avoids the need to maintain the mold under a fixed load provided by a weight or spring pressure. Instead, the welds ensure that the mold halves are locked together under the correct degree of compressive load.

Conveniently, the mold halves are bonded together by welding in the region of the peripheries of the mold halves.

The mold halves are preferably formed from a thermoplastic polymer, preferably a polyolefin, such as polypropylene, which is readily welded by contact with a heated metal tool. It is unnecessary to weld the mold halves together by a continuous weld line. Indeed, it is preferable to spot weld the rim portions of the mold halves together at spaced locations around the rims of the mold halves.

Preferably the mold filling and closing procedure of this invention is combined with the method of bonding the molds together under load just described.

BRIEF DESCRIPTION OF THE DRAWINGS

One illustrative form of the present invention will now be described in conjunction with the accompanying drawings in which.

DETAILED DESCRIPTION OF THE PREFERRED EMBODIMENT

Figure 1:
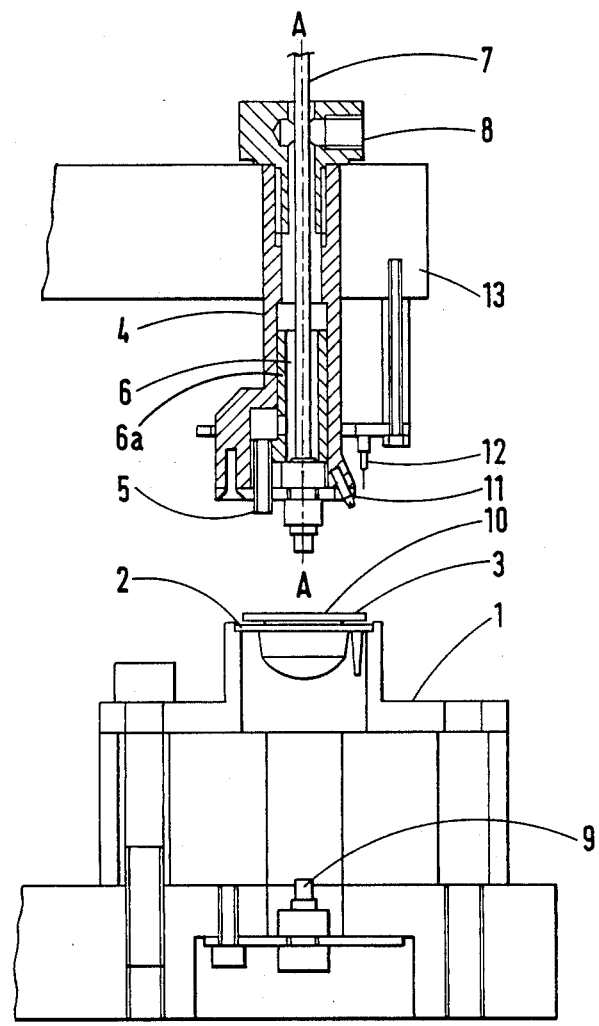
FIG. 1 is a side elevation of the mold filling and closing apparatus.

Referring to the drawings and particularly to FIG. 1, the apparatus comprises a table for supporting the female mold half 2. FIG. 1 shows a male mold 3 already received by the female mold from a closure head 4 mounted above table 1. Closure head 4 is arranged to move along axis A—A towards and away from table 1, e.g. by means of an hydraulic ram (not shown) and is provided with vacuum holders 5 (in fact 3 holders are spaced equally around axis A—A) for holding a male mold half. Vacuum is supplied to holders 5 along annular passage 6 between a tube 6a and a coaxial inner tube 7, and through a port 8. A filling tube (not shown) is mounted adjacent to the closure head and arranged to enter the female mold half and introduce a measured amount of liquid polymerizable composition into the female mold using a metering pump. A suitable pump is described in our concurrent patent entitled "Metering Pump" and EP 0195618 (EPA 86301871.9). The filling tube is then moved away and the head 4 moves down towards the female mold along the line A—A carrying the male mold held on vacuum holders 5.

Figure 5:
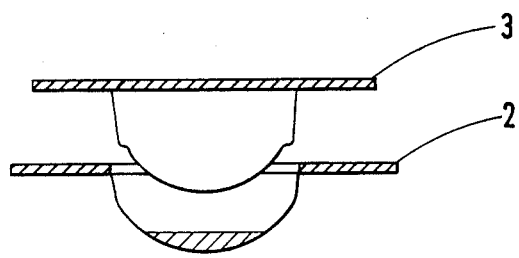
FIGS. 5, 6 and 7 are diagrammatic views of the mold illustrating steps in the filling and closing.

FIG. 5 indicates the movement of the male mold into the female while the former is supported on the vacuum holders.

Figure 6:
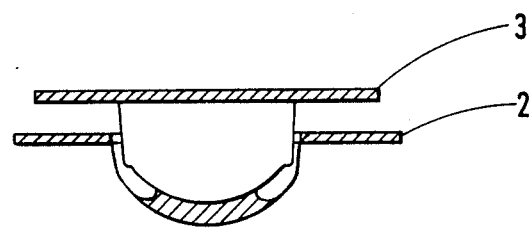

It is important to detect the moment when the tip of the male mold touches the surface of the liquid monomer as illustrated in FIG. 6. This is achieved by directing an infra-red beam through the inner tube 7 along the line A—A, through the appropriate light-transmissive mold halves and onto a fiber optic sensor mounted beneath the table 1 at 9. The sensor gives a sharp response at the moment when the male mold touches the liquid surface and this sharp discontinuity in the response of the sensor is conveniently used as a signal to cause the vacuum supplied to holding tubes 5 to be shut off and thereby cause the male mold to fall into the female mold. It is believed that the reason for this sharp response is that the pool of liquid monomer in the female mold half acts as a positive power lens and focusses radiation from the infra-red source onto the sensor. When the male half touches the surface of the liquid, this 'lens' is destroyed so that there is a sharp reduction in the infra-red radiation falling on the sensor. This movement is probably effected by a combination of gravity and surface tension and during this movement the male mold is guided by the mating surfaces on the mold halves so that it enters the female mold correctly aligned to the proper axis.

Figure 7:
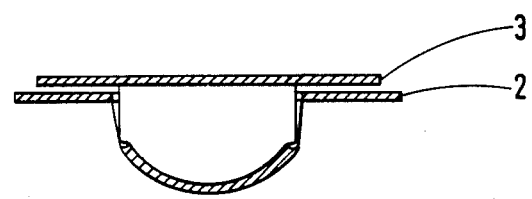

The head 4 follows the downward movement of the male mold until it rests on the upper flange via bearing pins 11. As in the case of the tube 5 there are conveniently 3 bearing pins 11 equispaced around the head 4. The weight of the head 4 provides a predetermined closing pressure applied to the mold halves thus ensuring that the cavity defined by the two mold halves is completely filled with monomer. The situation after the mold halves have been pressed together is illustrated in FIGS. 7 and 8.

Figure 2:
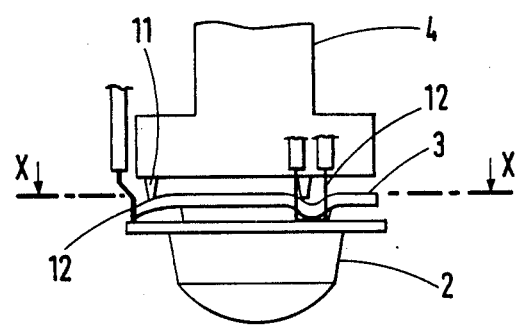
FIG. 2 is a partial side elevation of the mold after closure showing the step of bonding the two mold halves together by welding.
Figure 3:
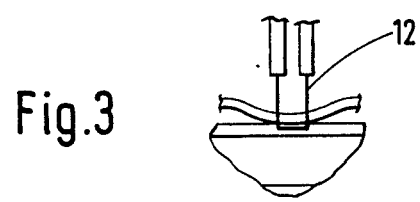
FIG. 3 is a scrap view in elevation showing details of the welding tool and the deflection of the flange of the male (upper mold half) during welding.
Figure 4:
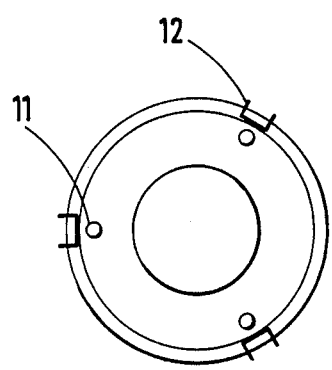
FIG. 4 is a cross-sectional view taken on the line X—X in FIG. 2.

As can be seen from FIGS. 2 and 3, the load applied to the flange 10 through the pins 11 causes deformation of portions of the flange of the male mould downwardly into contact with the corresponding portion of the flange of the female mould 2. At this point, hot wire welding probes 12 are lowered on carriage 13 to weld together the contacting edge portions of the flanges of the male and female mold halves at three or more spaced locations around the mold. The probes 12 are then retracted but the closing pressure is maintained by holding the metal block in place for a few seconds to ensure that the welds are set. Carriage 13 is then retracted and the mold is then moved to a thermostatically controlled environment (e.g. an air circulating oven or water bath) until polymerization is complete. After the monomer has polymerized to a solid lens, the mold is opened by cutting through the spot welds, opening the mold and removing the lens.

Figure 8:
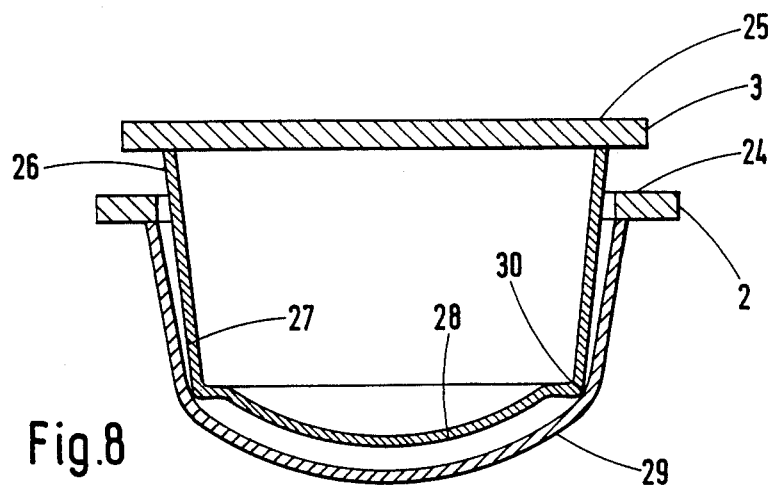
FIG. 8 is an enlarged view of the mold in the fully closed and filled condition of FIG. 7.

Referring to FIG. 8, this shows a mold comprising a female mold half 2 and a male mold half 3 inserted therein in the fully closed condition. The mold halves are made from a stiff thermoplastic polymer such as polypropylene. Each mold half comprises a flange portion 24 and 25 and an integrally molded hollow body portion 26 and 27. As indicated in the drawing the body portions 26 and 27 have a slight inward taper. In the base areas 28 and 29 of the body portions, the surfaces have a smooth surface corresponding to highly polished surfaces of the master metal molds of the injection machine on which they are produced.

The curvature of surface 28 determines the base curve of the lens and the curvature of the surface 29 determines the power of the lens. The lens cavity is defined by the space bounded by the surfaces 28 and 29 and a peripheral skirt 30 which is integral with male mold half 3.

It will be appreciated that this invention is not limited to the use of electrically heated welding probe and that other methods of heating can be employed to effect the temporary welding of the two mold halves together. It is even possible to use means other than welding to form the bond between the two mold halves, e.g. hot melt adhesive, although spot welding has practical advantages.

It has been found that by virtue of the accurate alignment of the mold halves achieved by the process of this invention, the profile of the edge of the cast lenses conforms closely to the desired form. As a consequence, lenses can be produced which require little or no edge polishing.

What is claimed is:

1. A process for casting contact lenses using male and female mold halves formed from a light transmissive thermoplastic polymer which comprises:
   (a) placing a polymerisable liquid composition in the female mold half, (b) guiding the male mold half into the female mold half along a substantially vertical path passing through the axes of the male and female mold halves, (c) detecting the moment of initial contact between the male mold half and the surface of the polymerisable liquid composition, (d) simultaneously with the detection of said initial contact releasing said male mold half, (e) applying a closing pressure to said mold halves to thereby define a closed mold cavity filled with said liquid polymerisable composition, and (f) while maintaining said closing pressure, causing the polymerisable liquid composition to cure and then removing the lens from the mold.

2. The process of claim 1 wherein the moment of initial contact is detected by directing a light beam along the axes of said mold halves.

3. The process of claim 2 wherein the light beam is an infra-red beam.

4. The process of claim 2 wherein the light beam is normally focused on a sensor by a liquid lens formed by the liquid polymerisable composition in the female mold half and whereby there is a sharp reduction in the light falling on the sensor on contacting the male mold half with said liquid lens.

5. The process of claim 1 wherein the closing pressure in step (f) is maintained by bonding the mold halves together.

6. The process of claim 5 wherein said bonding comprises welding said mold halves together.

7. The process of claim 6 wherein said mold halves include flange portions and step (d) is carried out by pressing on the flange portion of the male mold half to deform the flange portion of said male mold half and wherein the flange portions are then welded together.

8. The process of claim 6 wherein the thermoplastic polymer used is polypropylene.

9. Apparatus for casting lenses by placing a volume of a liquid polymerizable composition in a light transmissive female mold, inserting and positioning a light transmissive male mold in the female mold, said apparatus comprising a substantially horizontal support for the female mold, a holder for releasably holding the male mold, means for moving the male mould in said holder towards and into the female mold along a substantially vertical path passing through the axes of the molds and means for detecting contact between the male mold and the surface of the liquid composition and causing said holder to release the male mold.

10. Apparatus according to claim 9 in which the means for detecting contact between the male mold and the surface of the liquid in the female mold comprises an infrared source aligned with the axes of the molds and an infrared detector located on the opposite side of the mold to the source, the output from said detector being connected to the holder means so as to cause the holder to release the male mold at the instant of contact with the liquid surface.

11. Apparatus according to claim 9 or claim 10 which includes welding heads associated with the holding means which are effective to spot weld flanges of the male and female molds together after closure.

* * * * *